Patented Dec. 21, 1926.

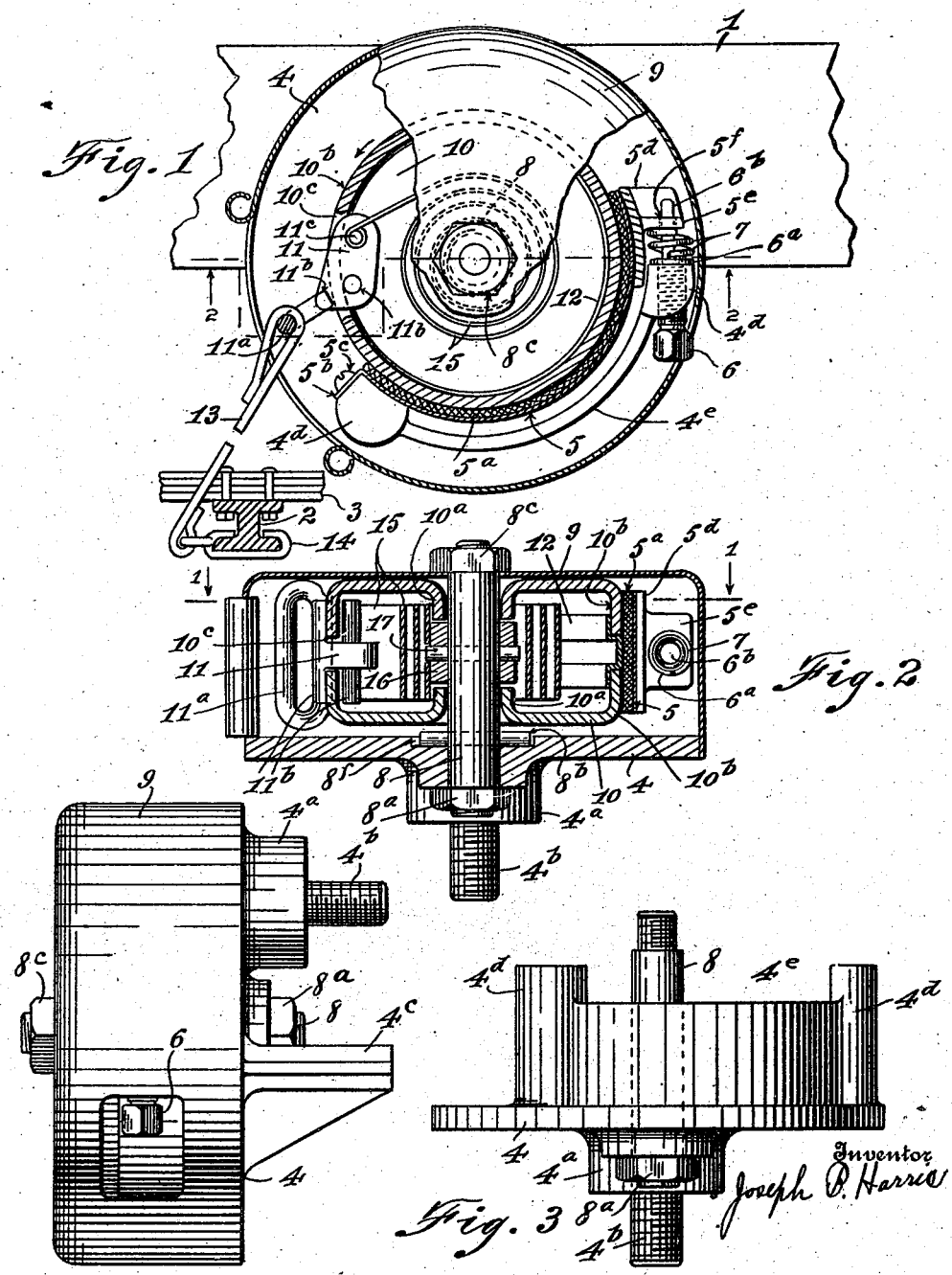

1,611,311

UNITED STATES PATENT OFFICE.

JOSEPH B. HARRIS, OF CLEVELAND, OHIO, ASSIGNOR TO THE HARRIS SPRING BRAKE COMPANY, OF CLEVELAND, OHIO, A CORPORATION OF OHIO.

VEHICLE SPRING CONTROLLER.

Application filed April 25, 1925. Serial No. 25,756.

My invention relates to improvements in vehicle spring controllers, and more particularly to mechanism of this type for modifying or controlling the action of the vehicle springs, including means particularly designed and adapted to modify the action of such springs when moved in one direction. My improved device is adapted to be applied to a vehicle in such a way as to permit the free yielding of the springs under compression stresses while modifying and controlling the reflex action or rebound of the vehicle carried by such springs. By the use of my invention in this manner, there is no tendency to stiffen the springs in the direction in which they move when taking up the shock incident to meeting and passing over obstructions or undulatory surfaces and hence full elasticity is secured at such times, thereby permitting the vehicle springs to act quickly and in the most efficient manner.

The primary object of my invention is to provide a generally improved spring controller or rebound check of this type, which will be exceedingly simple in construction, cheap of manufacture, and efficient in use, as well as one in which the parts are so constructed and disposed relative to each other as to reduce the liability to breakage or disarrangement to the minimum.

A further and important object is the provision of means for frictionally retarding the rebound of the vehicle whereby breakage of the vehicle springs is prevented and the vehicle is caused to ride smoothly over the roughest roads, together with improved means for adjusting the retarding means to meet the varying conditions and exigencies of actual service and to provide for the maximum efficiency thereof.

A still further and important object is the provision of an improved controller of this type in which the various parts are so arranged and disposed relative to each other as to automatically compensate for wear on the friction bearing surfaces without materially lessening the pressure or resistance between such surfaces, as well as one in which the pressure between the friction bearing surfaces may be adjusted or varied, as desired, to compensate for the varying loads to be carried by the vehicle springs.

A still further and important object is the provision of an improved form of relatively fixed clutch or brake member,—preferably in the specific form of a segmental brake shoe resiliently and adjustably carried so as to automatically compensate for wear in the frictional engaging parts and provided with a readily renewable brake liner and brake liner carrying strip or section.

With the above mentioned and other ends in view, the invention consists in the novel construction, arrangement and combination of parts, hereinafter described, illustrated in one of its embodiments in the accompanying drawings, and particularly pointed out in the appended claims.

Referring to the drawings, forming a part of this specification, Figure 1 is a fragmentary side elevation of the front portion of a vehicle chassis frame and the front axle and interposed vehicle spring, equipped with a controller constructed and connected in accordance with this invention, the longitudinal section of the controller unit being taken substantially on line 1—1 of Fig. 2.

Fig. 2, a central longitudinal cross sectional view of the assembled controller unit, detached, taken on line 2—2 of Fig. 1.

Fig. 3, a plan view of the underside of the attaching or bearing block, detached, and illustrating in particular the relatively fixed clutch or brake shoe carrying abutment, the brake liner and brake liner carrying section of the brake shoe being removed for the purpose of clearer illustration of the parts.

Fig. 4, a front elevation of the complete or assembled unit, detached from the vehicle chassis side bar.

Similar numerals of reference designate like parts throughout all of the figures of the drawings.

The improved controller comprises relatively fixed and movable brake or clutch members, one of these members being connected to the spring suspended member or body of the vehicle, such for example, as the vehicle chassis frame or side bar 1, the other member through suitable connection being connected to a relatively movable vehicle member, such for example, as the axle shoe carrying the adjacent vehicle supporting spring 3, as illustrated in Fig. 1 of the drawings.

As a means of providing a suitable bearing or carrying block for the various working parts and conveniently connecting an assembled controller unit to a relatively fixed part of the vehicle, such for example, as the chassis side bar 1, a bearing block 4, is provided, said block being provided with a bearing axle or spindle 8.

As a convenient means of attaching the block 4 to the chassis side bar 1, the inner side of the base or bracket portion of the block is provided with a boss 4$^a$, carrying a threaded bolt 4$^b$, adapted to extend through a suitable opening in the chassis side bar 1 and to be connected thereto by means of a suitable nut at the opposite side thereof. As a means of preventing any relative circumferential movement of the attaching block or unit when mounted, a laterally extending abutment or bracket 4$^c$, is provided adapted to extend beneath and interlock with the lower edge of the chassis frame bar 1.

As a means of removably mounting and securing the relatively fixed clutch or brake member to the bearing block 4, the latter is provided with clutch or brake shoe carrying abutments 4$^d$, spaced apart and arranged near the outer periphery of the block 4 and, in the present instance, rigidly connected and braced by means of the interposed web or bridge member 4$^e$.

The relative circumferentially fixed clutch or brake member is preferably in the specific form of a brake shoe comprising a brake liner carrying section 5, or brake shoe proper, and a brake liner 5$^a$, secured thereto in a well known and understood manner. The segmental shoe or liner carrying section is provided at one end with a radially extending flange or lug 5$^b$, seated on one of the abutments 4$^d$ and secured thereto by means of a fastening element or screw 5$^c$. The liner carrying section 5 of the brake shoe is preferably of flexible material and is provided at one end with a carrying bracket 5$^d$, terminating in a lug 5$^e$.

As a means of cushioning and adjusting the relatively circumferentially fixed clutch or brake 5 relatively of the movable or rotatably mounted clutch or brake member, hereinafter described, and particularly as a means of causing said brake or clutch member 5 to automatically take up any wear of the brake liner 5$^a$, the abutment 4$^d$ adjacent to the lug 5$^e$ is provided with a threaded adjusting screw 6, provided at its top with a shoulder and carrying a collar or washer 6$^a$ affording a shoulder and having a reduced stem or guide portion 6$^b$, surrounded by a cushioning spring 7, interposed between the collar 6$^a$ and the lug 5$^e$. The stem or reduced portion 6$^b$ extends through a guide opening 5$^f$ in the lug 5$^e$. It will be apparent that by adjusting the adjusting screw 6, the relative tension of the spring 7 upon the outer or lug carried end of the brake shoe may be adjusted, and consequently the tension of the brake liner 5$^a$, carried by the brake shoe 5, may be correspondingly adjusted or set.

As a convenience in manufacture and assembly of parts, the spindle 8 is in the specific form of a bolt removably mounted in a boss opening of the block 4 by means of a nut 8$^a$, and as a means of preventing the spindle 8 from rotating, a cross pin 8$^b$ is mounted or seated in a recess 8$^f$ in the face of the block 4. As a means of enclosing the various working parts after being assembled, a surrounding housing or casing 9, is provided, said casing being provided with a central opening receiving the end of the spindle 8 and being secured upon the block by means of a nut 8$^c$.

The relatively movable clutch or brake is mounted on the spindle 8 and, in the present instance, is in the specific form of a brake drum rotatably mounted on the axle or spindle 8. As a convenience in mounting and assembling the parts, and particularly the interior convolute spring and attached drum actuated clutch, hereinafter referred to, the brake drum is preferably made up of two complementary or companion members 10, having interior centrally located bearing flanges 10$^a$, forming the bearing opening for the spindle 8 and provided at their outer periphery with inturned rim forming flanges 10$^b$. The rim portions 10$^b$ are spaced apart forming a circumferentially split brake drum, the split or recess portion 10$^c$ forming a guide for the brake drum actuating clutch 11, and being preferably provided with an interior slidably mounted cover or bridge band 12.

As a means of intermittently actuating and progressively advancing the circumferentially split brake drum 10 with each rebound of the vehicle spring and the spring suspended vehicle chassis, the clutch 11 is provided with a loop-eye or arm 11$^a$, connected to a strap or connecting member 13, leading downwardly and connected to the axle 2 through the medium of a suitable axle clamp or clevis 14.

As a means of guiding the clutch 11 in its respective working and return movements or impulses, as well as causing such clutch to engage with the relatively movable brake drum so that the clutch actuating member 11 and the brake drum are simultaneously moved in one direction upon rebound of the spring supported vehicle body, and of returning such clutch relatively of said brake drum without movement of said brake drum as held by the brake shoe and upon compression of the vehicle spring, the web or body portion 11 of the clutch operating in the guide recess 10° is provided with spaced abutments or clutch members 11ᵇ, adapted to slide upon the inner and outer peripheries of the rim portions 10ᵇ of the drum when given a return or retrograde movement for a new working impulse to check the rebound, and as a means of quickly returning the clutch to a new position for re-engagement with the brake drum, as upon the sudden compression of the vehicle spring in passing over an obstruction, a convolute spring 15 is provided, said spring 15 being connected at its inner end to a spacing and connecting collar 16, interposed between the bearing flanges of the companion members of the brake drum, said collar being secured by means of a cross or key pin 17. The outer end of the convolute spring is provided with a coil or loop-eye passing over a connecting pin 11ᶜ, and, if desired, one end of the bridge band 12 may be connected to the pin 11ᵇ on the clutch at the inner side of the brake and being adapted to reciprocate with the clutch.

Having thus described one of the embodiments of my invention, without having attempted to set forth all the forms in which it may be made, or all the modes of its use, what I claim and desire to secure by Letters Patent is,—

1. In combination with a circumferentially split brake drum and a supporting spindle therefor, a convolute spring connected to the latter and arranged within said drum, and a drum actuating clutch supported and guided by said circumferentially split brake drum in spaced relation to the spindle and connected to and returned by said convolute spring for a new working impulse.

2. In combination with a bearing block carrying a circumferentially split brake drum and a drum supporting spindle, a spring arranged within said drum, and a drum actuating clutch arranged within and guided by the circumferentially split portion of said brake drum and connected to said spring whereby the latter returns the clutch for a new working impulse without retrograde movement of said drum and means supported from said clutch closing the split of the brake drum and combining with the clutch to prevent entrance of dirt and dust to the drum.

3. In a device of the character described, a carrying block provided with a rotatably mounted brake drum, a brake shoe resiliently and adjustably mounted on said block in engagement with said brake drum, and a spring resisted oscillatory clutch mounted on and guided by said drum and movable relatively of and with said drum in opposite directions to intermittently move and progressively actuated said drum.

4. In a device of the character described, in combination with a bearing block provided with a spindle carrying a circumferentially split brake drum made up of two spaced companion parts, and a spring resisted adjustable brake shoe in engagement with said drum, a drum actuating clutch guided by said circumferentially split brake drum, and a spring arranged within said drum and connected to said clutch for returning the latter for new working impulses.

5. In a device of the character described, a brake drum comprising two complementary side sections spaced apart forming an intervening guide-way, a drum actuating clutch member extending in said guide-way and provided with spaced abutments engaging with the inner and outer peripheries of said brake drum, and a convolute spring within said brake drum connected to said clutch member and returning the same for new working impulses relative to the advancement of said brake drum.

6. In combination with two relatively movable vehicle parts including an interposed spring, a relatively fixed brake shoe and housing attached to one of said vehicle parts, a relatively movable brake drum having a split peripheral wall, a clutch connected to the other of said vehicle parts and movable in and relatively of and with the split peripheral wall of said relatively movable brake drum in opposite directions upon corresponding movements of said vehicle parts toward and from each other, the clutch having portions engaging said peripheral wall at the inner and outer faces thereof.

7. In a structure of the character described, including a spring suspended vehicle, a bracket head including a segmental brake member and an axially located spindle, an oscillatory brake drum on the latter surrounded by said segmental brake member, and a spring resisted clutch member guided by and arranged to intermittently engage and release said oscillatory brake drum as moved in opposite directions by the rebound of the vehicle and the compression of said spring, respectively.

8. In a structure of the character described, in combination with relatively movable vehicle parts, a bracket block on one of said parts carrying a circumferentially split hollow brake drum, and a relatively fixed spring resisted brake member in engagement with the outer periphery thereof, a clutch movable in and guided by the split portion of said brake drum and connected to the other of said vehicle parts and movable in opposite directions upon the movement of said relatively movable vehicle parts in like directions.

9. In a device of the character described, a brake drum comprising two complementary inwardly flanged side sections spaced apart forming an intervening guide-way, a rocking drum actuating clutch member extending in said guide-way and provided with spaced abutments engaging with the inner and outer flanged portions of said brake drum at the outer periphery thereof and a convolute spring within and independent of said brake drum and connected to said clutch for returning the latter for new working impulses relative to said brake drum.

10. In a device of the character described, in combination with a bearing block provided with a spindle carrying a circumferentially split brake drum, a housing covering the latter and connected to said spindle, and a spring resisted brake shoe in engagement with the outer periphery of said drum, a drum actuating clutch slidably mounted in and guided by said circumferentially split brake drum, and a convolute spring connected to said spindle and arranged within said drum and connected to said clutch for returning the latter for a new working impulse without movement of said drum.

11. In a device of the character described, a carrying block provided at one side with a rotatably mounted brake drum and supporting abutments spaced from the latter, a brake shoe resiliently and adjustably mounted on said abutments in engagement with said drum, and a spring resisted clutch mounted on and guided by the periphery of said drum and movable relatively of and with said drum in opposite directions to intermittently move and progressively actuate said drum in one direction and in a retrograde direction by said spring for new working impulses as held by said brake shoe.

12. In a structure of the character described, including relatively movable vehicle parts and an interposed vehicle spring, a bearing block connected to one of said parts and provided with a relatively fixed segmental brake shoe, a relatively movable brake member having a face in engagement with the latter, means for cushioning and adjusting said brake shoe relative to said relatively movable brake member, means for moving said relatively movable brake member in one direction upon a rebound of the interposed vehicle spring and the movement of said vehicle parts from each other including a part engaging said face of the movable brake member, and means for returning said actuating means without moving said relatively movable brake member upon movement of said vehicle parts toward each other and the compression of said vehicle spring.

13. In a controller for vehicle springs, including a spring supported body, a bracket and housing connected to the latter, a shaft carried by said bracket and housing and provided with a cushioned segmental brake, means for adjusting the latter to vary the frictional engagement of the relatively movable brake member, a relatively movable brake member on said spindle engaged by said segmental brake, and a spring resisted oscillatory clutch connected to a relatively movable vehicle member in slidable and guided relation to said relatively movable brake member whereby the latter is intermittently and progressively moved in one direction against the resistance of said segmental brake upon the rebound of the vehicle and said clutch member is slidably moved in an opposite direction to re-engage said brake member upon a compression of the vehicle spring.

14. In a structure of the character described, an attaching bearing block provided with relatively fixed abutments, a segmental brake shoe carried thereby, a bearing spindle carried by said block and provided with a rotatable brake drum in engagement with said brake shoe, a convolute spring connected to and surrounding said spindle within said brake drum, and a drum actuating clutch member connected to said convolute spring and slidably connected to the inner and outer peripheries of said brake drum and movable in an opposite direction upon like movements of one of the connected vehicle parts whereby said brake drum is intermittently engaged and moved progressively in one direction against the resistance of said brake shoe and said brake drum actuating clutch is intermittently moved in an opposite direction without imparting movement to said drum.

15. In a device of the character described, a rotatable brake drum having a split peripheral wall, a segmental friction element engaging said peripheral wall, a drum actuating member operating in the split of the peripheral wall and having portions engaging the inner and outer faces of said peripheral wall and a spring within said brake drum connected to said clutch member and returning the same for new working impulses relative to the advancement of the brake drum.

16. In a device of the character described, a pivot, a brake drum rotatable upon the pivot and having a peripheral wall confronting the pivot, a segmental brake element having frictional engagement with one face of said peripheral wall, a clutch for rotating the drum having a portion engaging said face of the peripheral wall and other portions engaging the opposite face thereof and a spring connected with said clutch and returning the same for new working impulses relative to the advancement of said brake drum.

17. In a device of the character described, a rotatable brake drum having a split peripheral wall, a segmental friction element engaging said peripheral wall, a drum actuating member operating in the split of the peripheral wall and having portions engaging the inner and outer faces of said peripheral wall, a spring within said brake drum connected to said clutch member and returning the same for new working impulses relative to the advancement of the brake drum and a split closing member operating within the portions of the split unoccupied by the clutch member and connected with said clutch member.

In testimony whereof I have affixed my signature.

JOSEPH B. HARRIS.